Nov. 29, 1949 R. E. GRUBER 2,489,635
NUGGET SAVER FOR DREDGES
Filed Jan. 13, 1947 2 Sheets-Sheet 1
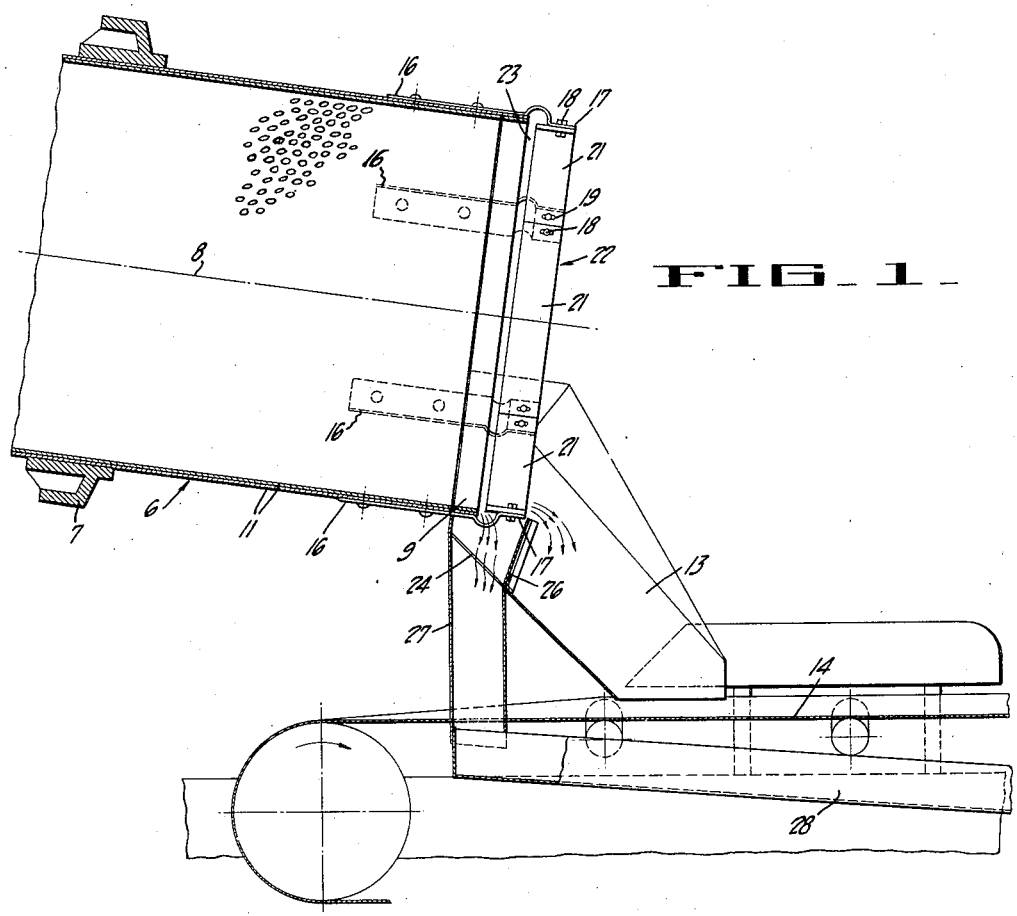
FIG_1_
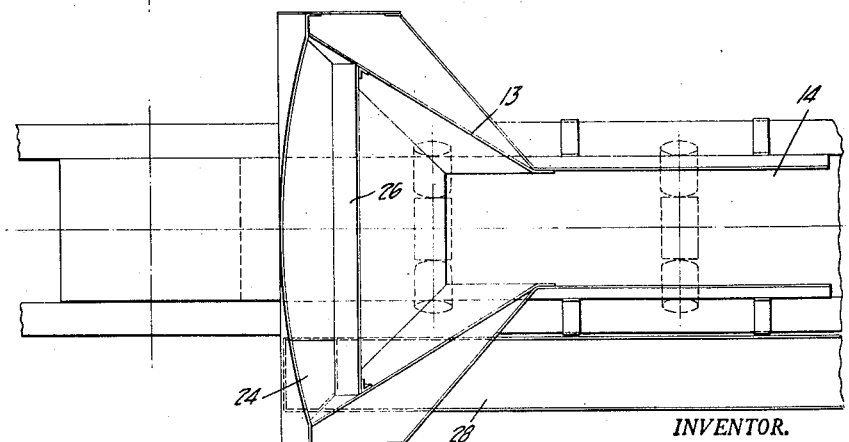
FIG_2_
INVENTOR.
Ralph E. Gruber
BY Nov. 29, 1949     R. E. GRUBER     2,489,635
NUGGET SAVER FOR DREDGES
Filed Jan. 13, 1947     2 Sheets-Sheet 2
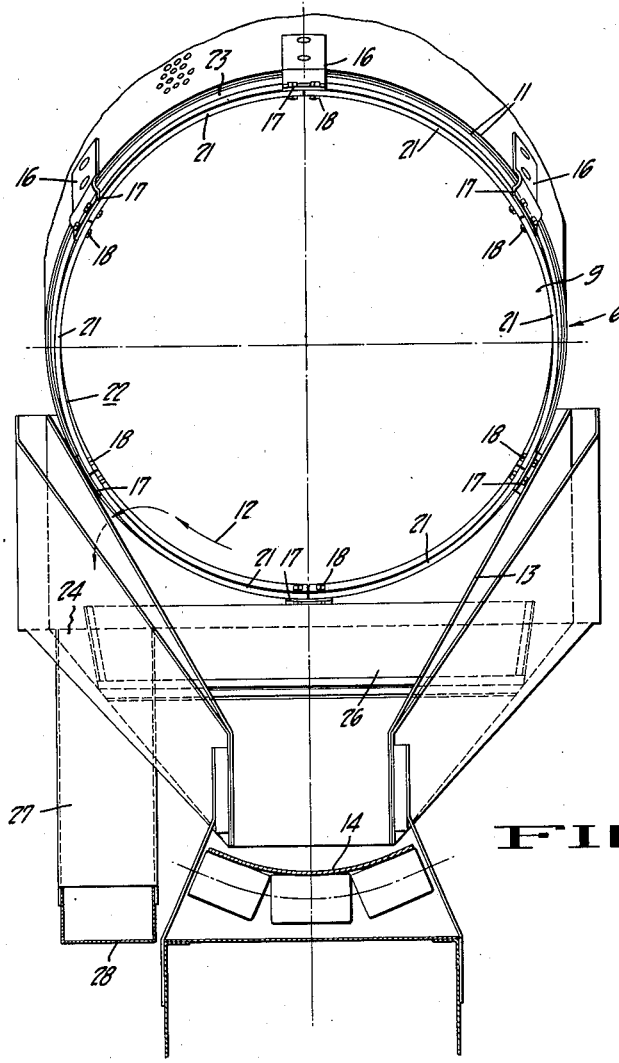
FIG_3_
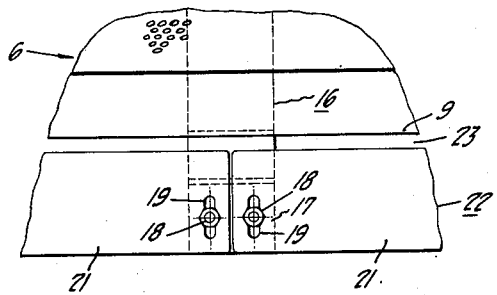
FIG_4_
INVENTOR.
Ralph E. Gruber
BY Patented Nov. 29, 1949

2,489,635

UNITED STATES PATENT OFFICE 2,489,635

NUGGET SAVER FOR DREDGES

Ralph Emil Gruber, San Francisco, Calif., assignor to Yuba Manufacturing Company, a corporation of California Application January 13, 1947, Serial No. 721,760

2 Claims. (Cl. 209—288)

My invention relates generally to dredges particularly of the alluvial type normally utilized for recovering values such as tin, platinum and gold from gravel deposits and is especially concerned with a structure for augmenting the recovery of values in nugget form, more especially when such nuggets are of a substantial size.

In many dredge fields the material handled runs a gamut of sizes from fine sand to quite large rocks and boulders and in some areas the values range from very small particles up to occasional nuggets of a size comparable to some of the intermediate gravel.

In the customary type of dredge utilized for recovering these values, the excavated material is all passed through a revolving screen, sometimes called a trommel or grizzly, which amounts substantially to a barrel open at both ends and with its axis inclined. The revolving screen has metal walls having a large number of relatively small (for example, $\frac{5}{16}$th of an inch diameter) perforations therethrough. As the screen is revolved, all of the gravel passes from one end toward the other end thereof, meanwhile being subjected to a forceful spray of water. The fine material and most of the values pass through the holes in the revolving screen to suitable saving devices beneath it. It is normally assumed that the remaining coarse material that does not pass through the apertures is valueless. It is passed out the lower open end of the screen to be transported to a dump location. It happens, however, that occasionally gravels are encountered in which nuggets of value are larger than the screen openings and are therefore passed to the dump through the open end of the revolving screen.

It is therefore an object of my invention to provide means for saving values or nuggets which do not pass through the screen openings but would otherwise be discharged with the waste.

Another object of my invention is to provide means for separating values of relatively large size from the discharged material and retaining them on the dredge.

A further object of the invention is to provide means variable or settable at will to retain certain size nuggets in the value-recovery mechanism.

A further object of the invention is to provide a nugget saver applicable to dredges already constructed and that can be installed or removed without substantial shut-down time.

A further object of the invention is to provide a nugget saver which does not substantially interfere with the normal discharge from the dredge.

Other objects together with the foregoing are attained in the embodiment of the invention selected for illustration and description herein.

In the accompanying drawings,

Figure 1 is a view of a portion of a dredge showing the inclined revolving screen and associated mechanism in cross section on a vertical median plane.

Figure 2 is a plan of most of the mechanism illustrated in Figure 1 but omitting the revolving screen.

Figure 3 is an end elevation of the mechanism disclosed in Figure 1, portions being broken away to reduce the size of the figure and other portions being shown in cross section on a transverse vertical plane.

Figure 4 is a detail showing in plan the connection of part of the nugget saver to the revolving screen mechanism.

In its preferred form the nugget saver of my invention is for installation on a dredge having an inclined, circular-cylindrical, revolving screen open at its discharge end and normally effective to discharge into a conveyor for carrying away waste material. Mounted on the open lower end of the revolving screen by a plurality of axially extending straps is a ring made up of a number of arcuate parts secured to the straps by axially adjustable connections so that the ring can be spaced from the end of the screen in a predetermined or settable amount to provide an annular opening of a dimension to pass the size nuggets desired. The diameter of the ring is less than the diameter of the open end of the screen in order that the ring will constitute a barrier to the discharge of certain size material. Immediately beneath the annular opening and displaced to one side of a median line in the direction of advance of the lower portion of the screen is an opening into a chute for leading values and other materials discharged thereinto to a value-saving mechanism.

While the nugget saver of my invention is variable in many of its details in accordance with the particular dredge installation, it is generally of the type illustrated wherein the dredge includes a revolving circular screen 6. A supporting band 7 assists in mounting the screen for rotation about a longitudinal axis 8 inclined to the horizontal so that the open end 9 of the screen is somewhat lower than the remaining portions thereof. The screen is comprised of a plurality of plates 11 having perforations (not shown) piercing most of their surface and of a predetermined diameter to pass small particles.

The material dredged is introduced into the upper end of the revolving screen (at the left of Figure 1) and as it progresses by gravity in an axial direction through the screen, it is sprayed with sharp jets of water. All of the fine material is washed from the mass and passes through the openings in the screen to value-recovering mechanism, not shown. The remaining material comprising boulders, large rocks, smaller pebbles and also under certain circumstances, nuggets of the valuable metal, passes toward the lower end of the screen. It is impelled by the rotation of the screen, for example in the direction of the arrow 12 in Figure 3, to pile up and roll along one side of a central portion of the screen. As this material advances, it would normally pass through the lower end of the screen into a discharge chute 13 and onto a stacker belt 14 advancing to convey the received material to a dump or tailings pile.

In accordance with the invention, the lower end of the revolving screen is provided with a plurality of straps 16 extending parallel to the axis 8 and firmly secured in place to project beyond the end of the revolving screen. Each of the straps is looped and terminates in a pad 17 receiving a fastening 18. The fastening pierces an axially elongated slot 19 in one of several arcuate segments 21 together forming a band or ring 22 disposed coaxially with the revolving screen. The ring has an internal diameter less than the diameter of the screen.

The ring is in this manner disposed in a spaced relationship with the lower end of the screen to provide an annular opening 23 therebetween, the size of the annular opening being readily settable by manipulating the fastenings 18 and axially moving segments 21. Since the ring is made in parts, it can be installed on or removed from the revolving screen without shutting down for long the general operation of the dredge.

Material which passes down the interior of the screen and normally would be discharged freely from the open end thereof is classified as to size by the ring 21. That is, the large boulders and large particles pass freely over the ring, but gravel of a size comparable to the difference in diameter of the screen and of the ring is arrested by the ring and if it is also small enough, it drops through the annular opening 23. In this way the nuggets and gravel of comparable size are passed through the opening 23. Most of this action takes place to one side of the center line. As shown in Figure 3, gravel and nuggets, especially of intermediate size tend to congregate to one side of the center of the screen.

To receive the separated material, I provide in the chute 13 a special opening 24 immediately below the location at which most of the material is discharged but supplement it by a barrier 26 removably positioned across the chute 13 to deflect all particles passing through any part of the opening 23 into the opening 24.

Material passing through the opening 24 is conveyed by gravity through a duct 27 into a special sluice 28 leading to value-recovering mechanism, not shown, which effectuates a final separation of the nuggets from the gravel. The nuggets are from time to time removed while the remaining gravel passes onto the stacker belt 14 and finally is discharged at the waste location.

The partition 26 and the ring are removable so that in the event operations proceed into ground where the nuggets are not of a size to justify the use of the described mechanism it can be removed, and with the aperture 24 plugged, the structure is restored to standard dredge condition.

In accordance with the invention, there is provided a mechanism readily adaptable to standard dredges and as readily removable therefrom when not needed for arresting and segregating nuggets of value from the remaining gravel, the particular size limit being variable and adjustable at will.

I claim:

1. A nugget saver for a dredge comprising, an axially inclined cylindrical screen having screen openings therethrough of a size to readily pass a mixture of water, small pebbles and the like, an annular ring of less diameter than said screen, and means for supporting said ring on said screen concentrically thereto in a position axially spaced from the lowermost end of said screen, the end of said screen and said ring defining a continuous peripheral opening therebetween of a width substantially greater than the openings in said screen, and the innermost edge of said ring defining an annular shoulder inwardly of the inner surface of said screen and coincident with the outer edge of said annular opening.

2. A nugget saver as defined in claim 1 wherein said ring is supported on said screen for axial adjustment thereon to vary the width of said peripheral opening.

RALPH EMIL GRUBER.

REFERENCES CITED

The following references are of record in the file of this patent:

UNITED STATES PATENTS

| Number | Name | Date |
|---|---|---|
| 126,968 | Keller | May 21, 1872 |
| 209,730 | Vellines | Nov. 5, 1878 |
| 253,380 | Hawley | Feb. 7, 1882 |

FOREIGN PATENTS

| Number | Country | Date |
|---|---|---|
| 6,322 | Australia | Mar. 9, 1927 |
| 335,380 | Germany | Mar. 23, 1921 |